United States Patent [19]

Leib

[11] Patent Number: 4,972,498

[45] Date of Patent: Nov. 20, 1990

[54] ALIGNMENT SYSTEM FOR AN OPTICAL MATCHED FILTER CORRELATOR

[75] Inventor: Kenneth G. Leib, Wantagh, N.Y.

[73] Assignee: Grumman Aerospace Corporation, Bethpage, N.Y.

[21] Appl. No.: 216,399

[22] Filed: Jul. 7, 1988

[51] Int. Cl.$^5$ .............................................. G06K 9/76
[52] U.S. Cl. .................... 382/31; 350/162.13; 364/822; 382/42
[58] Field of Search ..................... 350/162.13, 162.12, 350/162.14, 3.75, 3.6, 3.67, 3.68, 3.72, 3.73; 382/42, 31, 65, 45, 48, 8; 358/236, 240, 250; 364/822

[56] References Cited

U.S. PATENT DOCUMENTS

| | | | |
|---|---|---|---|
| 3,425,770 | 2/1969 | Mueller et al. | 350/162.13 |
| 3,435,244 | 3/1969 | Burckhardt et al. | 350/162.13 |
| 3,497,705 | 2/1970 | Adler | 350/162.12 |
| 3,539,260 | 11/1970 | Burch | 350/162.13 |
| 3,612,698 | 5/1969 | Mathisen | 350/162.12 |
| 3,683,195 | 8/1972 | Johannsmeier et al. | 350/162.14 |
| 3,687,543 | 8/1972 | Cochran et al. | 350/162.14 |
| 3,796,497 | 3/1974 | Mathisen et al. | 350/162.12 |
| 4,712,851 | 12/1987 | Fusek et al. | 350/3.6 |
| 4,810,047 | 3/1989 | Pernick | 350/3.72 |

OTHER PUBLICATIONS

Reprinted from Applied Optics, vol. 21, p. 3278, 9/15/82, Real-Time Screen-Aided Multiple-Image Optical Holographic Matched-Filter Correlator.

Primary Examiner—Leo H. Boudreau
Attorney, Agent, or Firm—Scully, Scott, Murphy & Presser

[57] ABSTRACT

As multiple matched filter memories for optical correlators increase in size, their design, fabrication and alignment becomes increasingly complex and critical for proper operation of the optical correlator. The present invention places special alignment targets on the multiple matched filter memory to provide for proper alignment thereof to enable efficient correlator operation.

9 Claims, 6 Drawing Sheets

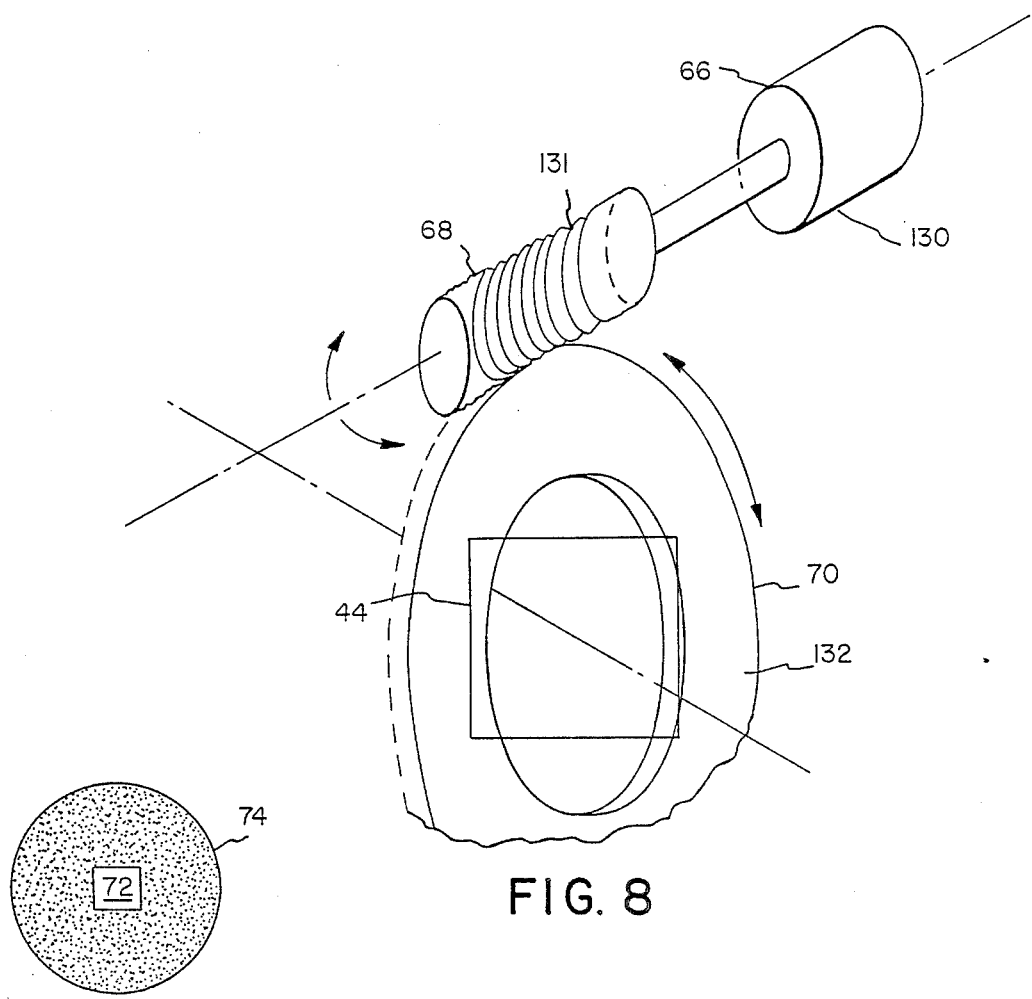
FIG. 8
FIG. 9
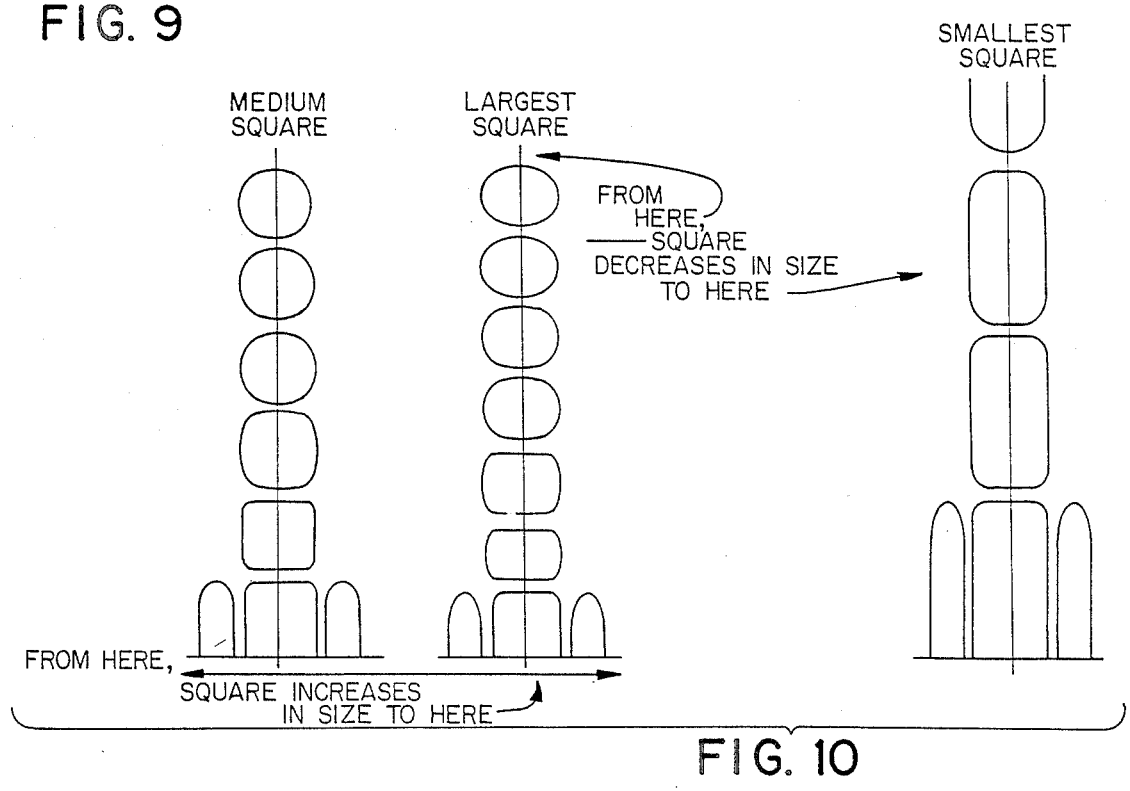
FIG. 10

ALIGNMENT SYSTEM FOR AN OPTICAL MATCHED FILTER CORRELATOR

BACKGROUND OF THE INVENTION

1. Field of the Invention

The present invention relates generally to an alignment system providing for the precise adjustment of the alignment of a matched filter array in an optical correlator employing the matched filter array as its memory. More particularly, the subject invention pertains to an alignment system for aligning a multiple matched filter array relative to a multiple holographic lens in an optical correlator wherein special alignment targets are added to the multiple matched filter array to provide for proper alignment thereof relative to the multiple holographic lens.

2. Discussion of the Prior Art

An optical correlation system is disclosed in U.S. Patent Application Ser. No. 814,209, filed Dec. 27, 1985, relative to which the alignment system of the present invention was developed. The optical correlation system disclosed therein optically compares an input image with optical information stored in multiple matched filters to provide identification and aspect information about the input image. In one disclosed embodiment, the input image is directed onto a spatial light modulator to spatially modulate a coherent beam of radiation. The spatially modulated radiation beam is directed onto a multiple holographic lens which performs a multiple number of Fourier transformations thereon to obtain an array of a multiple set of Fourier transforms of the spatially modulated radiation beam. A corresponding array of matched filters has the array of Fourier transforms incident thereon, with each matched filter comprising a Fourier transform hologram of an aspect view of an object of interest. Each matched filter passes an optical correlation signal in dependence upon the degree of correlation of the Fourier transform of the spatially modulated radiation beam with the Fourier transform hologram recorded thereon. An inverse Fourier transform lens receives the optical correlation outputs of the array of matched filters, and performs an inverse Fourier transformation on the optical correlation outputs. A detector then detects the inverse Fourier transforms of the optical correlation outputs, and the output thereof is utilized to determine identification and aspect information about the input image.

One problem with this type of optical correlator is that of obtaining a proper and precise alignment (x, y and $\theta$ rotational) of each individual matched filter with the particular Fourier transform incident thereon generated by the multiple holographic lens. A typical matched filter optical correlator is normally initially set or adjusted such that the axial distance along the z axis (optical axis), the $\gamma$ (pitch) adjustment, and the $\beta$ (yaw) adjustment remain properly set and aligned. The initial adjustments of z, $\gamma$ and $\beta$ are normally properly retained by the optical correlator, and do not require re-adjustment each time a new matched filter is placed therein. When a new matched filter is placed in a typical optical correlator, adjustments and alignments are normally required only along the x axis, the y axis, and the $\theta$ (roll) axis.

Burch, U.S. Pat. No. 3,539,260 discloses one arrangement for the automatic alignment of coherent optical spatial frequency filters, and uses four positional reference patterns superimposed along the orthogonal axes of a target matched filter plate, and the reference patterns are alternatively processed with the target pattern in a time division multiplex arrangement. This patent permits alignment for a limited application of one matched filter, and expresses no awareness of orientation or critical alignment for arrays of matched filters, nor does the patent disclose or use complex multiple holographic lens elements. For a system such as that disclosed in U.S. Ser. No. 814,209 which employs an array of multiple matched filters and a multiple holographic lens, this prior art approach cannot be used because all outputs are derived simultaneously and matched filter movement is required.

SUMMARY OF THE INVENTION

Accordingly, it is a primary object of the present invention to provide an alignment system for aligning a multiple matched filter array in an optical correlator.

A further object of the subject invention is the provision of an alignment system for aligning a multiple matched filter array relative to a multiple holographic lens in an optical correlator in which special alignment targets are added to the multiple matched filter array for alignment purposes.

In accordance with the teachings herein, the present invention provides an optical correlator for optically comparing an input image with optical information stored in a memory comprising an array of matched filters to provide identification and aspect information about the input image. More particularly, the subject invention is designed to provide for proper alignment of the array of matched filters in the optical correlator. In one disclosed embodiment, the input image is directed onto a spatial light modulator wherein it spatially modulates a coherent beam of radiation. The spatially modulated radiation beam is then directed onto a multiple holographic lens which performs a multiple number of Fourier transformations thereon to obtain an array of a multiple set of Fourier transforms of the spatially modulated radiation beam. A corresponding array of matched filters in an optical memory element has the array of Fourier transforms incident thereon, and the matched filters comprise Fourier transform holograms of different aspect views of an object of interest. Each matched filter passes an optical correlation signal in dependence upon the degree of correlation of the Fourier transform of the spatially modulated radiation beam with the Fourier transform hologram recorded by the matched filter. The optical memory element also includes at least two spaced alignment targets thereon to provide alignment information relative to the optical memory element. An inverse Fourier transform lens receives the optical correlation outputs from the array of matched filters, and performs an inverse Fourier transformation on each optical correlation output, and also upon the correlation output of each alignment target. A detector then detects the inverse Fourier transforms of the optical correlation outputs. A detector is also provided for the optical correlation output of each alignment target, and an alignment system is responsive to the output signals from the detectors for the alignment targets to properly align the optical memory element relative to the multiple holographic lens.

In greater detail, in a preferred embodiment herein array of matched filters includes an n $\times$ n array, and the two spaced alignment targets are two special alignment targets spaced outside diametrically opposite corners of the n × n array, and each special alignment target comprises a rectangular target providing sharp target edges. In alternative embodiments the corner positions of the n × n array could be used for the alignment targets (e.g. position 0,1 and n+1,n).

As discussed hereinabove, a typical matched filter optical correlator is normally initially set or adjusted such that the axial distance along the z axis (optical axis), the γ (pitch) adjustment and the β (yaw) adjustment remain properly set and aligned, and do not require re-adjustment each time a new matched filter is placed therein. When a new matched filter is placed in a typical optical correlator, adjustments and alignments are normally required only along the x axis, the y axis, and for θ (roll) angular alignment. In a preferred embodiment, the alignment system is digitally controlled, as by a microprocessor or a digital sequencer, to provide in sequence an x translational alignment, a y translational alignment, and a 0 angular alignment, and this alignment sequence is repeated until correct alignment is achieved.

BRIEF DESCRIPTION OF THE DRAWINGS

The foregoing objects and advantages of the present invention for an alignment system for an optical matched filter correlator may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 8 is a schematic illustration of one possible angular drive system for angularly aligning the multiple matched filter array relative to the multiple holographic lens;

FIG. 9 illustrates one advantageous embodiment of a special alignment target for a multiple matched filter array plate;

FIG. 10 illustrates one axis of the distribution of energy in the Fourier transform of a square aperture alignment target;

DETAILED DESCRIPTION OF THE DRAWINGS

The present invention relates to an optical correlator as is disclosed and described in U.S. patent application Ser. No. 814,209, filed Dec. 27, 1985, which uses a multiple holographic lens (MHL) - multiple matched filter (MMF) array.

A number of elements and concepts relating to the present invention are used frequently in this description and are essential to an understanding of its functioning and general principles of operation, and accordingly the nature and properties of several of those concepts are discussed initially hereinbelow for convenience.

A holographic lens (HL) is made by recording an interference pattern of an expanding point radiation source and a collimated radiation beam, which produces a hologram of a point source. When the holographic lens (after recording and processing, as on film) is illuminated, it recreates the point source, i.e., it functions as a lens. If the recording process is repeated before processing, a series of point source holograms, or a multiple holographic lens (MHL), is recorded on the film.

An optical correlator as described herein utilizes one of several possible distributions in offset angle, position and focal length in a multiple holographic lens array to produce an array of Fourier transforms of an input spatially modulated, laser radiation beam. In general, the particular requirements of the array will be determined by the particular commercial application being addressed. In summary, a holographic lens takes a Fourier transform of a laser beam illuminated scene or target, and a multiple holographic lens takes, simultaneously, a multiple set of Fourier transforms. A multiple holographic lens array is normally used in conjunction with a corresponding array of matched filters.

Figure 1:
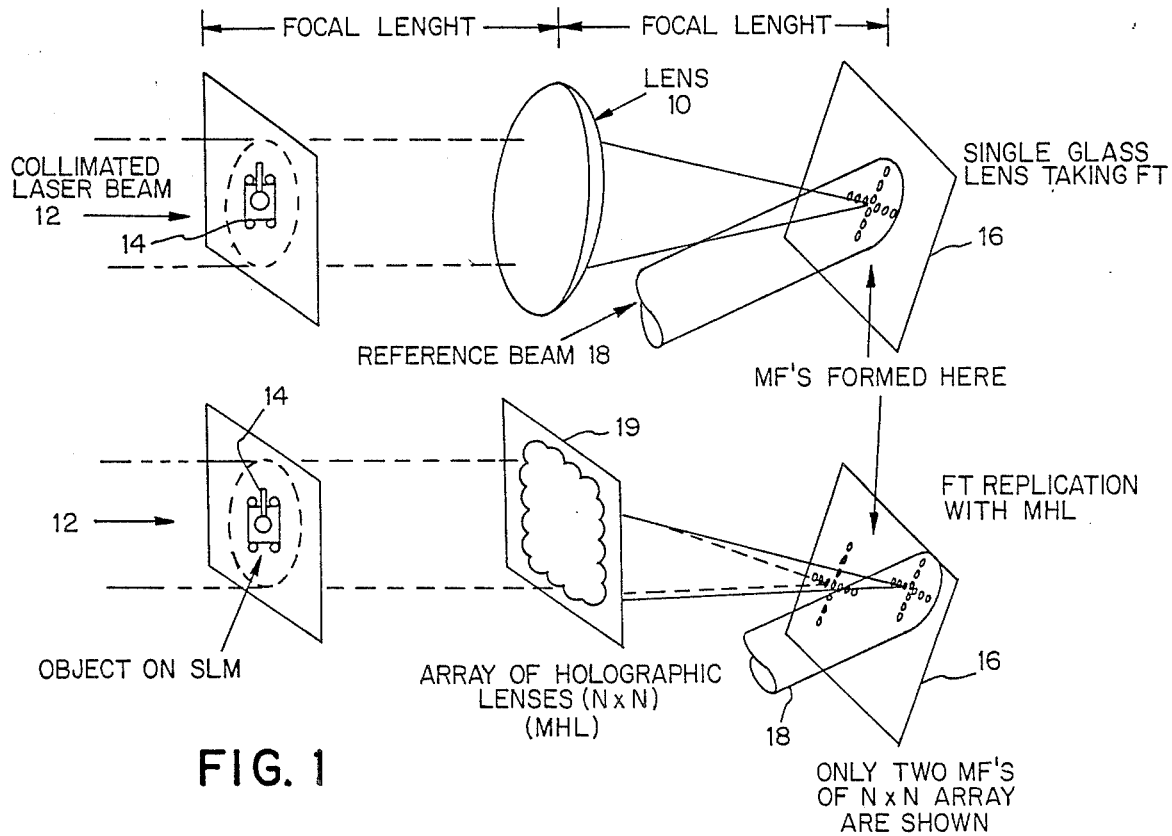
FIG. 1 illustrates in the upper portion thereof a lens taking the Fourier transform of an incident image and the fabrication of a matched filter therefrom with a reference beam, and in the lower portion thereof a multiple holographic lens (MHL) forming multiple Fourier transforms of an incident image and the fabrication of a multiple matched filter therefrom with a reference beam.

Referring to FIG. 1, when a lens 10 is illuminated by a spatially modulated collimated beam 12, (as when it is modulated spatially by passing through a recorded image 14 of a scene, target, etc.), the lens creates at its focal point a Fourier transform of the object(s), which can be recorded on a film 16, which is a basic lens property. When the Fourier transform is interfered with a collimated (or reference) beam 18 from the same source, an interference pattern results. This is called a Fourier transform hologram, or Matched Filter (MF), which is an optical spatial filter of the input object. When an arbitrary scene is later played through an optical correlator system employing that matched filter, the matched filter picks out and passes the object for which it was made. The signal passed by the filter is Fourier transformed again, and the optical correlation signal is detected. If the matched filter target is present, a sharp correlation signal results, whereas non-target signals result in broad low base correlation signals. Referring specifically to the lower portion of FIG. 1, when an array of multiple holographic lenses 19 is illuminated by a spatially modulated laser beam, the array of MHL 19 forms in the focal planes thereof on array of Fourier transforms of the object. A collimated reference beam 18 can be interfered therewith to form an array of Fourier transform holograms or matched filters which can be recorded on a matched filter plate or film 16. The MHL replicates the Fourier Transform (FT), and so instead of one FT, as many FTs are formed as are present in the MHL array. Before operation, a matched filter (MF) is fabricated at each point corresponding to one of the MHL focal points. This array of MFs constitutes the optical memory of the optical correlator. The MF can be fabricated for many targets, or for many aspects on one target, or for some combination thereof. In operation, all MFs in the array must be aligned for proper operation.

The matched filters or multiple matched filters as described herein could also be computer generated matched filters, or computer generated phase only matched filters. The only significant difference is that the computer generated matched filters can be fabricated so as to have no offset angle.

An optical correlator as described herein uses the sensitivity of a matched filter to object rotation or object scale size. As either of these aspects change (i.e., the object is at a different angle than the one for which the MF is made, or at a different distance, therefore at a different scale size), the correlation signal changes.

Figure 2:
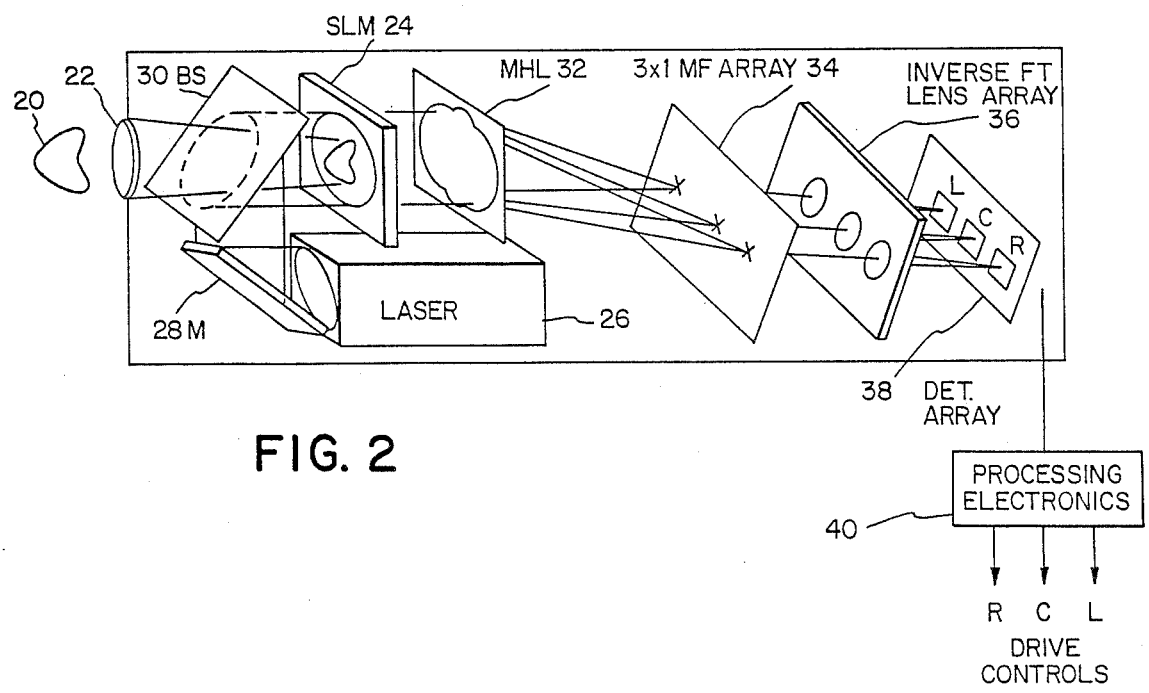
FIG. 2 is a schematic arrangement of an optical correlator application employing a multiple holographic lens and a multiple matched filter array which can employ the alignment system of the present invention to align the multiple matched filter relative to the multiple holographic lens.

FIG. 2 is a schematic arrangement of an optical correlator employing a multiple holographic lens and a multiple matched filter array which can employ the alignment system of the present invention to align the multiple matched filter relative to the multiple holographic lens. An object of interest 20 is positioned at the input to the optical correlator, and is imaged by an input lens 22 onto a spatial light modulator (SLM) 24, which spatially modulates the image onto a laser beam from a laser 26, directed thereto by a mirror 28 and beam splitter 30. The spatially modulated laser beam is Fourier transformed by a multiple holographic lens 32 and directed onto a corresponding array of matched filters 34. An inverse Fourier transform lens array 36 inversely Fourier transforms the output of the matched filters and directs the outputs thereof onto a detector array 38, the output signals of which are electronically processed at 40 to produce output control signals.

In summary, a matched filter is a Fourier transform hologram with properties that are sensitive to an input object's size, angular aspect and input location. These parameters can be predetermined in order to prescribe a set of angle and range (size) lines covering the anticipated object's aspects. The detector can be partitioned to resolve the location to the degree desired or a television type of detector can be used.

In the fabrication of a matched filter, the holographic fringe visibility is optimized at a particular spatial frequency that will satisfy the size and/or aspect sensitivity requirements. Because it is unlikely that both requirements can be satisfied simultaneously, a plurality of independent MFs are utilized in an optical correlator. The nature of different particular applications will generally require significantly different MF sensitivities.

Physically, the matched filter can be described by the Fourier transform of the target or input object, the holographic reference beam angle, and the system constant S as follows, $$S = (gF)^{-1} \frac{\text{cycles/mm}}{\text{mm}}$$

where g (mm) and F (mm) are the matched filter construction wavelengths and FT the lens focal length, respectively. The smaller the value of S, the easier it is to control parametric variation sensitivity, and locational problems also ease with smaller values of S.

A second important MF factor is the spatial frequency bandwidth. Matched filters can be optimized at any desired frequency, but the degree of object discrimination is dependent upon the fine details of the object and, thus, the higher frequencies. The frequency requirements must be considered along with the particular object's size, position, and aspect.

A primary object of the present invention is the automatic alignment of the MMF plate in the optical correlator by adding separate special MF targets to the MMF array. The output of the MF of the special targets, preferably spaced widely apart, is used to drive a stepper motor to obtain an alignment correction. An advantage of a MHL is that many lenses can be placed in the space one glass lens occupies. Lens arrays as large as 10×10 (100 lenses) can be fabricated, but more typically are 3×3, 5×5 or 6×6 arrays. The larger the MMF array, the more critical is the alignment problem, as each individual matched filter must be aligned in the optical correlator. While the fixed spacing provides a certain degree of automaticity (in spacing), it does not assure proper x or y translational alignment positioning or θ rotational alignment, particularly when a matched filter is replaced. The MF in the upper left corner of the array must be properly aligned as well as the MF in the lower right corner of the array. The larger arrays usually find the distance between diametrically opposite corners to be the greatest. Thus, it can be intuitively seen that even when the MMF is aligned in x and y, rotational sensitivity is greatest when the array is large.

Figure 3:
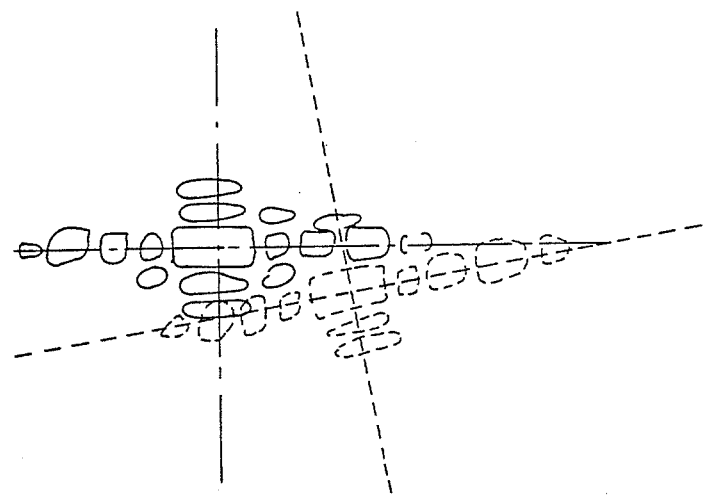
FIG. 3 is an enlarged schematic view of one matched filter pattern with a Fourier transform pattern projected thereon, as shown in dashed lines, and which is misaligned in x, y and θ.

FIG. 3 is an enlarged schematic view of one matched filter pattern with a Fourier Transform pattern projected thereon which is misaligned in x, y and θ. FIG. 3 illustrates one MF in an array as the dotted pattern. The laser pattern from one of the MHL array lenses is of the target and is shown as the solid line pattern. An object of the present invention is to align the two patterns with x, y and θ alignment operations.

Another point needs elaboration herein. Since the spatial frequencies of the MF —measured in cycles/mm—start in the center and proceed outwardly, a question arises as to the proper selection of frequency for the MF. When made around the origin, it is designated a low pass MF, and when made beyond that, a high pass MF. There is a wide range of possible selections in spatial frequencies, depending upon the characteristics of the particular system and target. The choice is usually that band of spatial frequencies which enhance the signal-to-noise ratio when target backgrounds are considered.

Figure 4:
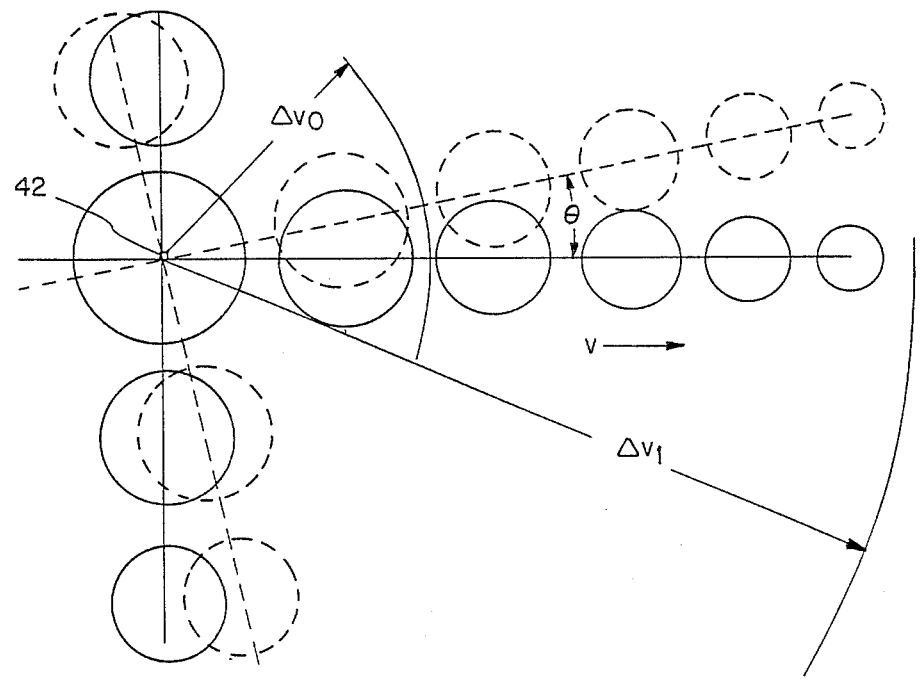
FIG. 4 is an enlarged schematic view of one matched filter pattern with a Fourier transform pattern projected thereon, as shown in dashed lines, and which is misaligned only with respect to θ.

FIG. 4 is an enlarged schematic view at one matched filter pattern with a Fourier transform pattern projected thereon which is misaligned only with respect to θ. For reference, the zero frequency, or the pattern centers 42, are aligned horizontally and vertically in FIG. 4 for direct comparison of the MF.

Consider now that the x and y offsets have been corrected for, which can be accomplished in the same manner as will be described for $\theta$ and that we have the situation shown in FIG. 4. The first two "lobes" or spatial frequency bands overlap to some degree and a degree of correlation can be obtained from the system, provided these were the regions where the MF is made. Should the MF be a higher frequency MF, the spatial frequency bands further out (and not overlapping) would have been used. Since they do not overlap, no correlation signal would be obtained therefrom. This indicates a limitation of the present system, which is a fine tuning system, not a gross adjustment device. However, the state of the art on these optical correlators has advanced to the point where gross adjustment requirements are designed into the basic correlator system. It can be seen, however, that the higher the spatial frequency, the more intolerant the matched filter is to fine misadjustments.

Pursuant to the present invention, and considering a 3×3 array, the 1-1 and 3-3 MF positions 45 (FIG. 5) in the array (using matrix notation of row-column designations) can be used to assure alignment since they are most widely separated. The targets at the 1-1 and 3-3 positions could be the same targets as normally incorporated in the MF array, but preferably are special targets added at those positions. Moreover, the present invention could also add special targets spaced even further apart, allowing the achievement of ultra-precise alignment beyond that possible with the array alone. Thus, two special targets can be spaced outside the array, and their outputs processed in two channels to derive a difference signal to be used for correction.

Figure 5:
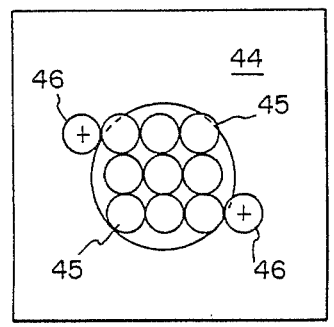
FIG. 5 illustrates a 3×3 array of matched filters on a matched filter plate having two alignment targets added to the matched filter plate at positions (0, 1 and n+1, n)

FIG. 5 illustrates one embodiment of a MMF plate 44 having a 3×3 array of matched filters thereon and further wherein the two designations ⊕ 46 indicate special alignment targets added to the MMF plate. The MHL must also be designed to meet this MMF requirement, and FIG. 6 illustrates how a MHL 48 can be designed and fabricated to meet this requirement, particularly with respect to the two alignment lenses 50 added thereto.

Figure 6:
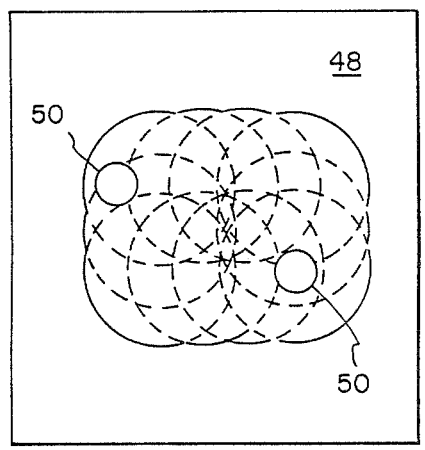
FIG. 6 is an illustration of a multiple holographic lens designed for operation with the matched filter array of FIG. 5.
Figure 7:
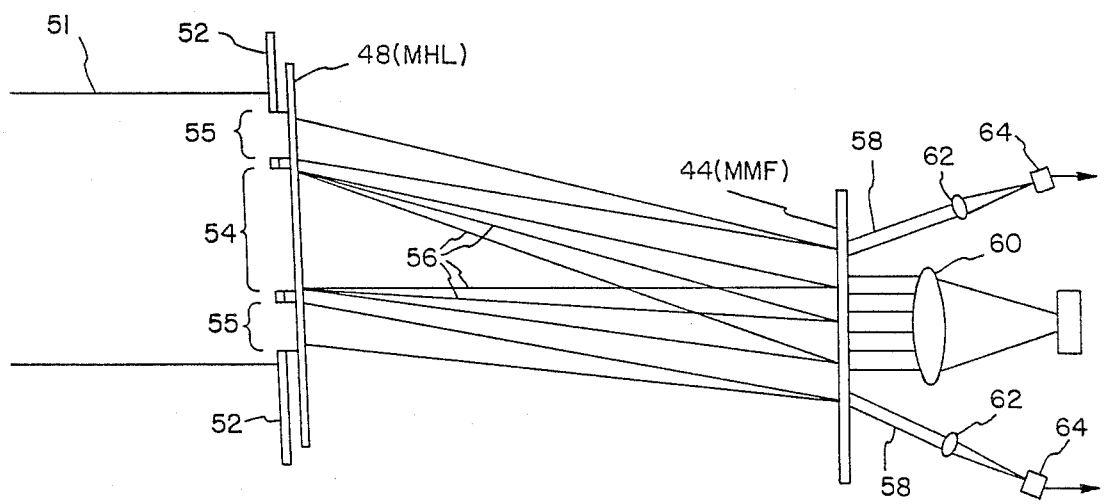
FIG. 7 is a schematic alignment arrangement illustrating the manner of operation of the combination of the matched filter array of FIG. 5 with the multiple holographic lens of FIG. 6.

FIG. 7 is a schematic alignment arrangement illustrating the manner of operation of the combination of the multiple matched filter array 44 of FIG. 5 with the multiple holographic lens 48 of FIG. 6. An incoming collimated laser beam 51 has modulation imposed at the center by an input image, while the outer portions thereof are used to modulate the special targets. An aperture plate 52 has a central aperture 54 for the central portion or the beam and two outer apertures 55 for the outer portions of the beam and the special targets, and assures separation of the beam illuminating the array and the special targets. The MHL 48 operates in a normal manner and has an offset angle with respect to the MMF plate 58. The input from the MHL 48 convolved with the memory elements of the MMF 44 develops two types of outputs. The first are the nine beams 56 addressing the nine target memory elements on the MMF 44. The second are the special target-MF outputs 58. A second lens 60 behind the MMF 44 perform a second Fourier transformation for the nine target beams and likewise lenses 62 perform second Fourier transformations for the two alignment beams. A pair of alignment target beam detectors 64 detect the correlation signals, compare them, and generate a difference signal to drive a stepper motor to provide for alignment correction. The present invention encompasses x, y and $\theta$ corrections by a digital computer or sequencer programmed to perform the x, y and $\theta$ alignment corrections in sequence as illustrated by the logic flow diagram of FIG. 13.

Figure 12:
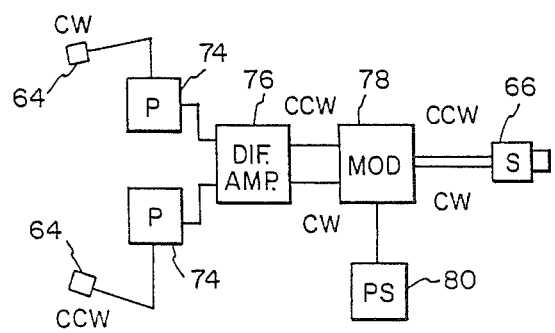
FIG. 12 is a functional block diagram of one drive arrangement for achieving alignment with a stepper motor.

FIG. 8 is a schematic illustration of one possible angular drive system for angularly aligning the multiple matched filter array relative to the multiple holographic lens. Referring thereto, a stepper motor 66 drives a worm gear 68, which, in turn, rotationally drives a large gear 70 holding the MMF 44. FIG. 12 is a schematic diagram of the interface circuit between the detectors 64 and the stepper motor 66, and will be explained in further detail hereinbelow.

An alignment fixture particularly designed for an optical correlator is disclosed in U.S. Pat. No. 4,936,655, issued June 6, 1990 and is particularly suitable for use with the present invention. In greater particularity, that patent application discloses an alignment fixture for an optical correlator providing for the adjustment of the alignment of a matched filter or multiple matched filter or a multiple holographic lens, along at least two transverse x and y axes, and also rotationally $\theta$ in roll.

A number of different special alignment targets 46 might be used in the present invention. Generally considered, they can be rectangular in order to provide sharp edges. One advantageous embodiment is a square aperture 72 on a black background 74, FIG. 9, since it produces similar distributions of energy along the orthogonal axes. FIG. 10 illustrates a representative Fourier transform for a square aperture from which a matched filter can be made. The larger the square, the closer in the FT moves, as illustrated in FIG. 10. One axis of this pattern is shown in FIG. 10. The portions further from the centerline axis represent the higher spatial frequencies. As an aligning target, the higher frequencies are desirable because the output target has a greater slope to its signal, and slight deviations in rotational (and x and y also) alignment result in large signal variations. Generally speaking, the higher the frequency of the MF, the sharper the output signal. Also, the movement of the special MF at the matrix 0-0 and 4-4 positions and rotation about the center of the MF array, is given by:

$\Delta_{MF} = C_1 \rho d$ where $\rho$ is the angular rotation, and d the inter row or inter column spacing of a uniform array. It can be seen that as the array gets larger in matrix size, the number of d spacings also increases so that a smaller $\Delta_{MF}$ is obtained only with a smaller rotation angle $\rho$. Thus, larger arrays become more sensitive and require more precise alignment, and hence, higher spatial frequency embodiments of the special target MF.

Figure 11:
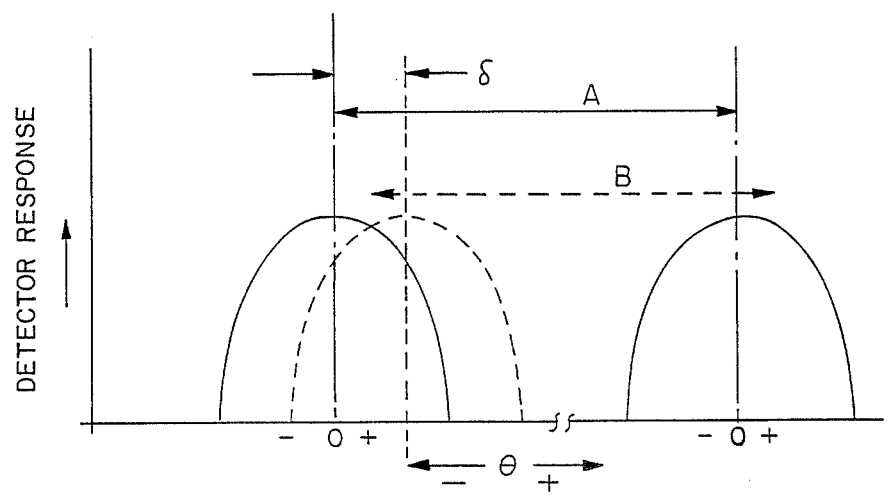
FIG. 11 is a graph of the detector responses to the two special alignment targets, and is useful in explaining the operation of the alignment system.

It is important that a small difference be provided between the orientation of the two alignment targets. FIG. 11 illustrates in solid lines the angular responses of the two special target, matched filters when the target plate is rotated. Distance A is projected down from the curves, and $\theta$ shows the detector responses as the MF plate is rotated. Note, importantly, that the detected signal from each is the same. Thus no difference and no correction signal can be developed. However, if one alignment target is rotated by $\rho$ a built in difference $\rho$ is provided between the two response angles. The distance B projected downwardly intersects different portions of the symmetrical response curves, and as one increases, the other decreases. This can be seen by projecting lines from the end of the B arrows down as the distance B indicator is translated left or right. Except at balance, an error signal is developed so that a correction signal can be developed.

FIG. 12 illustrates a schematic arrangement for achieving alignment by a stepper motor. The outputs from the two alignment target detectors 64 are amplified by two preamplifiers 74, the outputs of which are applied to a differential amplifier 76. The outputs of the differential amplifier indicate directional information in accordance with the explanation of FIG. 11, and are applied to a modulator circuit 78. The modulator circuit 78 develops a pulse output signal to drive a stepper motor 66, either clockwise or counterclockwise through an arrangement similar to that illustrated in FIG. 8. The modulator, the stepper motor, and a power supply 80 therefor, can be of a type presently in operation in existing embodiments of the correlator for performing other functions.

A typical detector 64 might be an EGG Corporation SGD-100 detector. The focal point of the input lens could be on the detector surface, although better performance might be achieved when the detector placed in front of the focal point. An out-of-focus placement avoids microscopic variations in the sensitivity of the detector surface and derives an average value over the entire surface. Variations in the characteristics of individual detectors can be equalized in the preamplifiers 74, and control signals are directed to the modulator 74, and are generated in the proper channel by the differential amplifier 76 as determined by a comparison of the two preamplifier signals. A suitable choice of stepper motor 66 and a backlash-less gearing drive 68 can assure precise MMF control.

Figure 13:
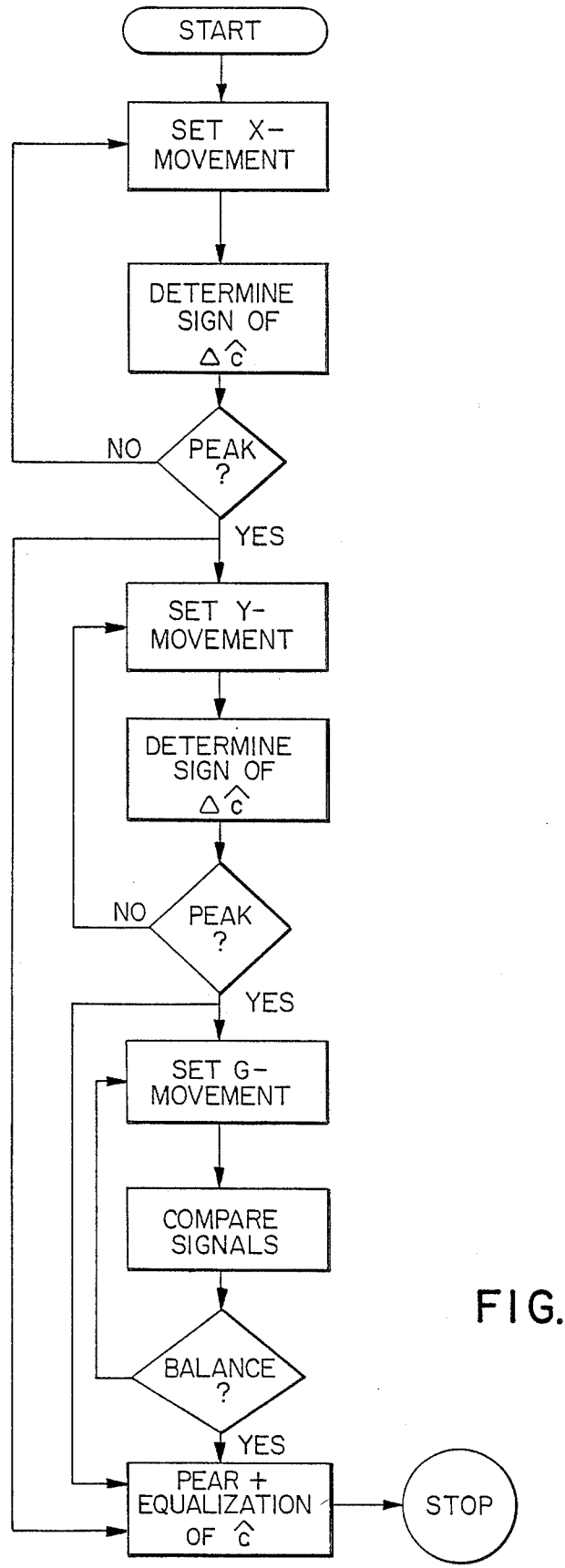
FIG. 13 is a logic flow diagram of one embodiment of software for sequentially achieving alignment x, y and θ.

FIG. 13 illustrates a logic flow diagram for a sequence in which x and y alignments are included, and illustrates the operation of software when the alignment is under computer control. A typical computer can be the Digital Equipment Corporation MINC-11, a modified version of a PDP-11/23, although other computers can be used in alternative embodiments. The x movement is controlled by a stepper motor, the output of which drives a separate x translational drive system instead of the O rotational drive of FIG. 8. In this instance, the outputs of the detectors 64 are compared, and the translational drive system activated until peak or maximum output signals are generated by the detectors 64. The x translational movement routine is followed by a similar y translational movement routine which drives a separate y translational drive system until peak or maximum output signals are generated by the detectors 64. This is followed by a θ rotational alignment as explained hereinabove.

While several embodiments and variations of the present invention for an alignment system for an optical matched filter correlator are described in detail herein, it should be apparent that the disclosure and teachings of the present invention will suggest many alternative designs to those skilled in the art.

What is claimed is:
1. An optical correlator for optically comparing an input image with optical information stored in an array of matched filters to provide identification and aspect information about the input image, and designed to provide for proper alignment of the array of matched filters in the optical correlator, comprising:

a. means for spatially modulating a coherent beam of radiation with an input image to be analyzed;
 b. a multiple holographic lens, having the spatially modulated radiation beam incident thereon, for performing a multiple number of Fourier transformations thereon to obtain an array of a multiple set of Fourier transforms of the spatially modulated radiation beam; c. an optical memory element having an array of matched filters recorded thereon, and having the array of Fourier transforms incident thereon, with the matched filters comprising Fourier transform holograms of aspect views of an object of interest and passing optical correlation signals in dependence upon the degree of correlation of the Fourier transform of the spatially modulated radiation beam with the Fourier transform hologram recorded by the matched filter, said optical memory element also having at least two spaced Fourier transforms of alignment targets thereon which pass optical correlation signals in dependence upon the degree of correlation of the Fourier transform of the spatially modulated radiation beam with the Fourier transforms of the alignment targets thereon to provide alignment information relative to the optical memory element;
 d. an inverse Fourier transform lens means for receiving the optical correlation signals of said array of matched filters, for performing an inverse Fourier transform on each optical correlation signal, including the optical correlation signal for each alignment target;
 e. a detector means for detecting the inverse Fourier transforms of the optical correlation signals, and for producing at least one detector output signal representative of the optical correlation signals, and including a separate detector for the inverse Fourier transform of each alignment target; and
 f. an alignment system responsive to the output signals of each detector for each alignment target for aligning said optical memory element relative to the multiple holographic lens in the optical correlator.

2. An optical correlator for optically comparing an input image with optical information stored in an array of matched filters to provide identification and aspect information about the input image, and designed to provide for proper alignment of the array of matched filters in the optical correlator, as claimed in claim 1, said array of matched filters including an n×n array, said at least two spaced alignment targets including two alignment targets spaced outside diametrically opposite corners of said n×n array.

3. An optical correlator for optically comparing an input image with optical information stored in an array of matched filters to provide identification and aspect information about the input image, and designed to provide for proper alignment of the array of matched filters in the optical correlator, as claimed in claim 2, each spaced alignment target comprising a rectangular target providing sharp target edges.

4. An optical correlator for optically comparing an input image with optical information stored in an array of matched filters to provide identification and aspect information about the input image, and designed to provide for proper alignment of the array of matched filters in the optical correlator, as claimed in claim 1, said alignment system being controlled to provide in sequence an x translational alignment, a y translational alignment, and a θ angular alignment.

5. An optical correlator for optically comparing an input image with optical information stored in an array of matched filters to provide identification and aspect information about the input image, and designed to provide for proper alignment of the array of matched filters in the optical correlator, as claimed in claim 1, said array of matched filters including an n×n array, said at least two spaced alignment targets including two alignment targets positioned at diametrically opposite corners of said n×n array.

6. An optical correlator for optically comparing an input image with optical information stored in an array of matched filters to provide identification and aspect information about the input image, and designed to provide for proper alignment of the array of matched filters in the optical correlator, as claimed in claim 5, each spaced alignment target comprising a rectangular target providing sharp target edges.

7. An optical correlator for optically comparing an input image with optical information stored in an array of matched filters to provide identification and aspect information about the input image, and designed to provide for proper alignment of the array of matched filters in the optical correlator, as claimed in claim 6, said alignment system being controlled to provide in sequence an x translational alignment, a y translational alignment, and a θ angular alignment.

8. An optical correlator for optically comparing an input image with optical information stored in an array of matched filters to provide identification and aspect information about the input image, and designed to provide for proper alignment of the array of matched filters in the optical correlator, as claimed in claim 1, each spaced alignment target comprising a rectangular target providing sharp target edges.

9. An optical correlator for optically comparing an input image with optical information stored in an array of matched filters to provide identification and aspect information about the input image, and designed to provide for proper alignment of the array of matched filters in the optical correlator, as claimed in claim 1, said alignment system being controlled to provide in sequence an x translational alignment, a y translational alignment, and a θ angular alignment.

* * * * *